(12) United States Patent
Boucard et al.

(10) Patent No.: US 12,513,081 B2
(45) Date of Patent: Dec. 30, 2025

(54) DATA ROUTING FOR NETWORKS ON A CHIP USING VIRTUAL CHANNELS AND CREDIT RESTRICTIONS

(71) Applicant: QUALCOMM Incorporated, San Diego, CA (US)

(72) Inventors: Philippe Boucard, Le Chesnay (FR); Christophe Layer, Paris (FR); Ameline Le Rouzic, Versailles (FR); Suzie Marin, Issy les Moulineaux (FR)

(73) Assignee: Qualcomm Incorporated, San Diego, CA (US)

( * ) Notice: Subject to any disclaimer, the term of this patent is extended or adjusted under 35 U.S.C. 154(b) by 56 days.

(21) Appl. No.: 18/610,586

(22) Filed: Mar. 20, 2024

(65) Prior Publication Data
US 2025/0300930 A1 Sep. 25, 2025

(51) Int. Cl.
*H04L 45/586* (2022.01)
*H04L 45/42* (2022.01)
*H04L 47/10* (2022.01)

(52) U.S. Cl.
CPC ......... *H04L 45/586* (2013.01); *H04L 45/42* (2013.01); *H04L 47/39* (2013.01)

(58) Field of Classification Search
None
See application file for complete search history.

(56) References Cited

U.S. PATENT DOCUMENTS

| | | | |
|---|---|---|---|
| 2013/0028083 A1* | 1/2013 | Yoshida | H04L 49/60 370/230 |
| 2017/0063625 A1 | 3/2017 | Philip et al. | |
| 2018/0157604 A1* | 6/2018 | Tietz | G06F 13/4022 |
| 2018/0159786 A1* | 6/2018 | Rowlands | H04L 49/109 |
| 2023/0064187 A1* | 3/2023 | Gupta | H04L 47/805 |

OTHER PUBLICATIONS

Burns A., et al., "A Wormhole NoC Protocol for Mixed Criticality Systems", 2014 IEEE Real-Time Systems Symposium, IEEE Computer Society, Dec. 2, 2014, pp. 184-195, XP032720915, p. 184-p. 189.
International Search Report and Written Opinion—PCT/US2025/014748—ISA/EPO—May 21, 2025.
Wikipedia: "Flit (Computer Networking)—Wikipedia", Wikipedia—The Free Encyclopedia, Dec. 31, 2023, 4 Pages, XP093276319, p. 1-p. 4.
Wikipedia: "Virtual Circuit—Wikipedia", Wikipedia—The Free Encyclopedia, Feb. 16, 2024, 4 Pages, XP093276322, p. 1-p. 4.

* cited by examiner

*Primary Examiner* — June Sison
(74) *Attorney, Agent, or Firm* — Norton, Rose, Fulbright US LLP

(57) ABSTRACT

This disclosure provides systems, methods, and devices for enhancing data communication and computation efficiency in Systems on a Chip (SoC). In one aspect, a system is provided that uses a network on a chip (NOC) to route communications between chip components using a plurality of network interfaces linked by shared data connections. The system may be configured to route communications via multiple virtual channels along the shared connections, with credit restrictions for the channels. Additionally, the system may support mechanisms for maintaining both private and shared credit balances for these virtual channels. Additional aspects are also discussed.

18 Claims, 7 Drawing Sheets

DATA ROUTING FOR NETWORKS ON A CHIP USING VIRTUAL CHANNELS AND CREDIT RESTRICTIONS

TECHNICAL FIELD

Aspects of the present disclosure relate generally to data routing within systems on a chip (SoCs), and more particularly, to virtual channel based routing that utilizes credit restrictions. Some features may enable and provide improved data routing, including more efficient network designs for SoCs.

INTRODUCTION

A System on Chip (SoC) may integrate all or many of the components of a computer or other electronic systems onto a single integrated circuit (IC). This integration can include a central processing unit (CPU), memory elements (like RAM and ROM), input/output ports, and secondary storage—all on a single substrate or microchip. SoCs might be designed to offer a complete electronic substrate system that functions similarly to a microcomputer or digital device. This architecture could potentially reduce the physical size and power consumption of devices, making SoCs suitable for compact, battery-powered devices such as smartphones, tablets, and wearable technology. By consolidating various functionalities into a single chip, SoCs could facilitate improvements in the performance and efficiency of electronic systems.

Network on Chip (NoC) is an approach within SoC design, specifically addressing the communication aspect of integrated systems. NoCs may employ a network-based communications subsystem to manage interactions between different IP (Intellectual Property) cores within an SoC. This subsystem could be comprised of routers and channels that facilitate data transfer across the chip in an organized manner, similar to data communication within large-scale computer networks.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The described techniques involve a system and method for improving the management and routing of data across a network on a chip (NoC) or between chiplets within large computing devices. These techniques leverage virtual channels and associated credit-based mechanisms for data routing, which help in optimizing the use of network resources, managing quality of service (QoS) efficiently, and preventing data transfer deadlock situations. The system includes various components like chip components, network interfaces, crossbars, and buffers that facilitate the dynamic allocation of network resources based on the current network conditions and data flow requirements.

One aspect provides a system on a chip (SoC) comprising chip components for receiving data and performing computations and a network on a chip (NOC) configured to route communications between the chip components. The NOC includes a plurality of network interfaces and a plurality of shared data connections between the network interfaces, wherein each of at least a subset of the plurality of network interfaces are configured to route communications using a plurality of virtual channels along the shared data connections and to enforce credit restrictions corresponding to each of at least a subset of the virtual channels.

Another aspect provides a method of a network interface in a network on a chip (NOC). The method comprises determining that received data contains a flit corresponding to a virtual channel of a plurality of virtual channels within the NOC; storing data contents of the flit within a register file, wherein the register file is shared between two or more of the plurality of virtual channels; storing a pointer to the stored data contents in a pointer buffer associated with the virtual channel; and transmitting the flit according to credit restrictions corresponding to each of at least a subset of the plurality of virtual channels.

A further aspect provides a system comprising chip components for receiving data and performing computations and a network on a chip (NOC) configured to route communications between the chip components. The NOC includes a plurality of network interfaces and a plurality of shared data connections between the network interfaces. Each of at least a subset of the plurality of network interfaces are configured to route communications using virtual channels along the shared data connections and to enforce credit restrictions corresponding to each of at least a subset of the virtual channels.

Techniques described herein may be performed by a signal processing device. The signal processing may be applied to data captured by one or more sensors of the signal processing device. By way of example, signal processing devices may comprise stand-alone audio devices, such as entertainment devices and personal media players, wireless communication device handsets such as mobile telephones, cellular or satellite radio telephones, personal digital assistants (PDAs), tablets, gaming devices, computing devices such as webcams, video surveillance cameras, or other devices with audio recording or audio capabilities.

The signal processing techniques described herein may involve devices having microphones and processing circuitry (e.g., application specific integrated circuits (ASICs), digital signal processors (DSP), graphics processing unit (GPU), or central processing units (CPU)).

In some aspects, a device may include a digital signal processor or a processor (e.g., an application processor) including specific functionality for data processing. The methods and techniques described herein may be entirely performed by the digital signal processor or the processor, or various operations may be split between the digital signal processor and the processor, and in some aspects split across additional processors. In some embodiments, the methods and techniques disclosed herein may be adapted using input from a neural signal processor (NSP) in which one or more parameters of the signal processing are controlled based on output from a machine learning (ML) model executed by the NSP.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some embodiments, the processor may be part of a mobile device including a first network adaptor configured to transmit data, such as images or videos (with associated or embedded sounds) in a recording or as streaming data, over a first network connection of a plurality of network connections; and a processor coupled to the first network adaptor and the memory. The processor may cause the transmission of output image frames described herein over a wireless communications network such as a 5G NR communication network.

The foregoing has outlined, rather broadly, the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
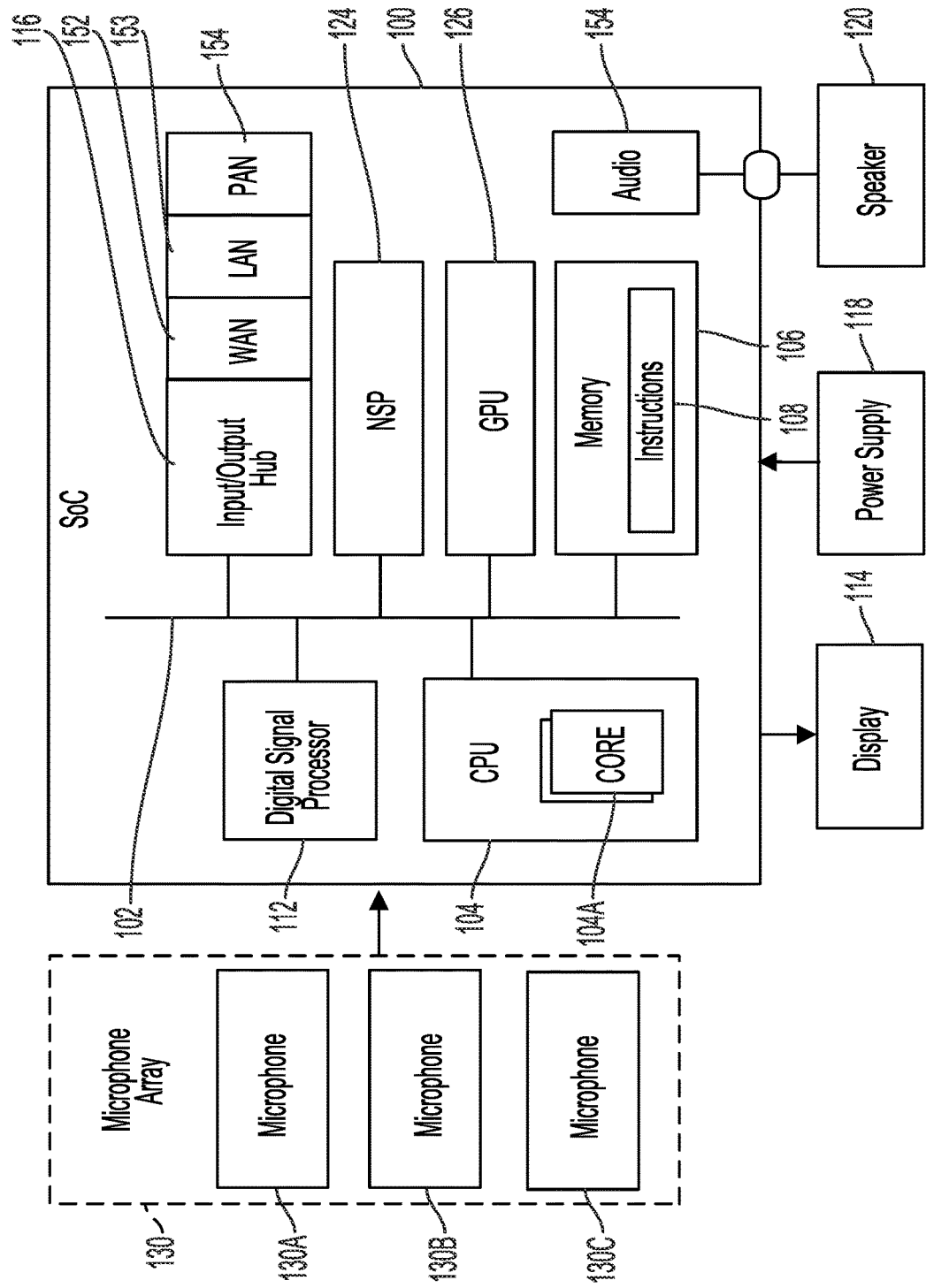
FIG. 1 shows a block diagram of a system-on-chip (SoC) configured for performing signal processing according to one or more aspects of this disclosure.

The present disclosure provides systems, apparatus, methods, and computer-readable media that data routing within an SoC using virtual channels and a credit-based mechanism. Existing techniques for managing data flow within devices or between chiplets often face challenges related to efficient resource utilization and preventing deadlocks in data routing. Typically, managing data flow in such environments involves using routing paths (such as multiple routing paths associated with different traffic classes) or limited resource allocation methods that do not adapt well to changing data traffic patterns. These limitations can lead to inefficient use of network resources, increased latency, and the potential for deadlock, where data packets are stuck in a state of waiting due to circular dependencies. Additionally, as devices get larger and more interconnected, wire counts within SoCs can increase exponentially, dominating the use of area and resources within a chip.

One solution to these problems is to implement a more dynamic and flexible approach to data routing that can adapt to varying network conditions and traffic patterns. The described techniques offer such a solution by introducing virtual channels and a credit-based mechanism for managing data flow. Virtual channels allow for the segregation of data packets based on their characteristics or priority, enabling more efficient and targeted routing. The credit-based mechanism further enhances this approach by dynamically allocating resources to different data streams, ensuring that high-priority data can be transmitted efficiently while still allowing room for lower-priority data.

Shortcomings mentioned here are only representative and are included to highlight problems with respect to existing devices and sought to improve upon. Aspects of devices described below may address some or all of the shortcomings as well as others. Aspects of the improved devices described herein may present other benefits than, and be used in other applications than, those described above.

Particular implementations of the subject matter described in this disclosure may be implemented to realize one or more of the following potential advantages or benefits. In some aspects, the benefits of the described techniques may lie in the ability to improve data routing efficiency and reliability in large computing systems. Specifically, the use of virtual channels and credit-based routing can reduce the overall wire count on resulting systems, reducing hardware costs and complexity. Furthermore, these techniques may prevent data transfer deadlocks and optimize resource utilization. For end users, this translates to faster and more reliable computing and data processing capabilities. Additionally the described techniques can help reduce the complexity and cost associated with designing and maintaining large computing systems. By providing a more adaptable and resource-efficient approach to data routing, the described techniques may offer significant advancements over existing methods, ultimately enhancing the performance and reliability of large-scale computing devices.

In some aspects, the present disclosure provides techniques for dynamically managing data flow within large computing devices or chip networks that may be particularly beneficial in optimizing network resource utilization and preventing data transfer deadlocks. For example, by incorporating virtual channels and a credit-based mechanism into the network design, these techniques can adapt to changing data traffic patterns and ensure efficient routing of high-priority data. This not only improves the overall functioning of the computing system but also enhances the user experience by providing faster and more reliable data processing capabilities.

The detailed description set forth below, in connection with the appended drawings to which the text references, is intended as a description of various embodiments and is not intended to limit the scope of the disclosure. Rather, the detailed description includes specific details for the purpose of providing a thorough understanding of the subject matter of this disclosure. It will be apparent to those skilled in the art that these specific details are not required in every case and that, in some instances, well-known structures and components are shown in block diagram form for clarity of presentation.

In the description of embodiments herein, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

An example device for recording sounds and/or processing sound signals using one or more microphones, such as a MEMS microphone, may include a configuration of one, two, three, four, or more microphones at different locations on the device. The example device may include one or more digital signal processors (DSPs), AI engines, or other suitable circuitry for processing signals captured by the microphones. The one or more digital signal processors (DSPs) may output signals representing sounds through a bus for storage in a memory, for reproduction by an audio system, and/or for further processing by other components (such as an applications processor). The processing circuitry may perform further processing, such as for encoding, storage, transmission, or other manipulation of the audio signals. In some embodiments, the example device may include audio circuitry including an audio amplifier (e.g., a class-D amplifier) for driving a transducer to reproduce the sounds represented by the audio signals. A speaker may be integrated with the device and coupled to the audio amplifier to be driven by the audio amplifier for reproducing the sounds. A connection may be provided by a jack or other connector on the device to couple an external transducer (e.g., an external speaker or headphones) to the audio amplifier to be driven by the audio circuitry to reproducing the sounds. In some embodiments, the jack may instead output a digital signal for conversion and amplification by an external device, such as when the jack is configured to be coupled to a digital device through a Universal Serial Bus (USB) Type-C (USB-C) connection and some or all of the audio circuitry is bypassed.

FIG. 1 shows a block diagram of a system-on-chip (SoC) configured for performing signal processing according to one or more aspects of this disclosure. The SoC 100 may include several components coupled together through an interconnect 102, which may be a network-on-a-chip (NoC) or a plurality of NOCs interconnecting various components. For example, although FIG. 1 illustrates several components coupled to the interconnect 102, the several components may be coupled to different busses with additional busses connecting the different busses to provide a path for communication between the components.

One example component in the SoC 100 is a digital signal processor 112 for signal processing. The DSP 112 may process audio signals received from microphones 130A, 130B, and 130C of microphone array 130. The DSP 112 may include hardware customized for performing a limited set of operations on specific kinds of data. For example, a DSP may include transistors coupled together to perform operations on streaming data and use memory architectures and/or access techniques to fetch multiple data or instructions concurrently. Such configurations may allow the DSP 112 to operate on real-time data, such as video data, audio data, or modem data, in a power-efficient manner.

The SoC 100 also includes a central processing unit (CPU) 104 and a memory 106 storing instructions 108 (e.g., a memory storing processor-readable code or a non-transitory computer-readable medium storing instructions) that may be executed by a processor of the SoC 100. The CPU 104 may be a single central processing unit (CPU) or a CPU cluster comprising two or more cores such as core 104A. The CPU 104 may include hardware capable of performing generic operations on many kinds of data, such as hardware capable of executing instructions from the Advanced RISC Machines (ARM®) instruction set, such as ARMv8 and ARMv9. For example, a CPU 104 may include transistors coupled together to perform operations for supporting executing an operating system and user applications (e.g., a camera application, a multimedia application, a gaming application, a productivity application, a messaging application, a videocall application, an audio recording application, a video recording application). The CPU 104 may execute instructions 108 retrieved from the memory 106. In some embodiments, the CPU 104 executing an operating system may coordinate execution of instructions by various components within the SoC 100. For example, the CPU 104 may retrieve instructions 108 from memory 106 and execute the instructions on the DSP 112.

The SoC 100 may further include a neural signal processor (NSP) 124 for executing machine learning (ML) models relating to multimedia applications. The NSP 124 may include hardware configured to perform and accelerate convolution operations involved in executing machine learning algorithms. For example, the NSP 124 may improve performance when executing predictive models such as artificial neural networks (ANNs) (including multilayer feedforward neural networks (MLFFNN), the recurrent neural networks (RNN), and/or the radial basis functions (RBF)). The ANN executed by the NSP 124 may access predefined training weights stored in the memory 106 for performing operations on user data.

The SoC 100 may be coupled to a display 114 for interacting with a user. The SoC 100 may also include a graphics processing unit (GPU) 126 for rendering images on the display 114. In some embodiments, the CPU 104 may perform rendering to the display 114 without a GPU 126. In some embodiments, the GPU 126 may be configured to execute instructions for performing operations unrelated to rendering images, such as for processing large volumes of datasets in parallel.

Processing algorithms, techniques, and methods that are described herein may be executed by at least one processor of the SoC 100, which may include execution by all steps on one of the processors (e.g., DSP 112, CPU 104, NSP 124, GPU 126) or may include execution of steps across a combination of one or more of the processors (e.g., DSP 112, CPU 104, NSP 124, GPU 126). For example, execution of the instructions by the CPU 104 as part of a multimedia application (e.g., a voice recorder, a sound recording, or a video recorder) may instruct the DSP 112 to begin or end capturing audio from one or more microphones 130A-C. The operations of the CPU 104 may be based on user input. For example, a voice recorder application executing on processor 104 may receive a user command to begin a voice recording upon which audio comprising one or more channels is captured and processed for playback and/or storage. Audio processing to determine "output" or "corrected" signals, such as according to techniques described herein, may be applied to one or more segments of audio in the recording sequence.

Input/output components may be coupled to the SoC 100 through an input/output (I/O) hub 116. An example of a hub 116 is an interconnect to a peripheral component interconnect express (PCIe) bus. Example components coupled to hub 116 may be components used for interacting with a user, such as a touch screen interface and/or physical buttons. Some components coupled to hub 116 may also include network interfaces for communicating with other devices, including a wide area network (WAN) adaptor (e.g., WAN adaptor 152), a local area network (LAN) adaptor (e.g., LAN adaptor 153), and/or a personal area network (PAN) adaptor (e.g., PAN adaptor 154). A WAN adaptor 152 may be a 4G LTE or a 5G NR wireless network adaptor. A LAN adaptor 153 may be an IEEE 802.11 WiFi wireless network adapter. A PAN adaptor 154 may be a Bluetooth wireless network adaptor. Each of the WAN adaptor 152, LAN adaptor 153, and/or PAN adaptor 154 may be coupled to an antenna that may be shared by each of the adaptors 152, 153, and 154, or coupled to multiple antennas configured for primary and diversity reception and/or configured for receiving specific frequency bands. In some embodiments, the WAN adaptor 152, LAN adaptor 153, and/or PAN adaptor 154 may share circuitry, such as portions of a radio frequency front end (RFFE).

Audio circuitry 154 may be integrated in SoC 100 as dedicated circuitry for coupling the SoC 100 to a speaker 120 external to the SoC 100, which may be a transducer such as a speaker (either internal to or external to a device incorporating the SoC 100) or headphones. The audio circuitry 154 may include coder/decoder (CODEC) functionality for processing digital audio signals. The audio circuitry 154 may further include one or more amplifiers (e.g., a class-D amplifier) for driving a transducer coupled to the SoC 100 for outputting sounds generated during execution of applications by the SoC 100. Functionality related to audio signals described herein may be performed by a combination of the audio circuitry 154 and/or other processors of the SoC (e.g., CPU 104, DSP 112, GPU 126, NSP 124).

The SoC 100 may couple to external devices outside the package of the SoC 100. For example, the SoC 100 may be coupled to a power supply 118, such as a battery or an adaptor to couple the SoC 100 to an energy source. The signal processing described herein may be adapted to and achieve power efficiency to support operation of the SoC 100 from a limited-capacity power supply 118 such as a battery. For example, operations may be performed on a portion of the SoC 100 configured for performing the operation at a lowest power consumption. As another example, operations themselves are performed in a manner that reduces an amount of computations to perform the operation, such that the algorithm is optimized for extending the operational time of a device while powered by a limited-capacity power supply 118. In some embodiments, the operations described herein may be configured based on a type of power supply 118 providing energy to the SoC 100. For example, a first set of operations may be executed to perform a function when the power supply 118 is a wall adaptor. As another example, a second set of operations may be executed to perform a function when the power supply 118 is a battery.

The SoC 100 may also include or be coupled to additional features or components that are not shown in FIG. 1. Although components are shown integrated as a single SoC 100, which may include all components built on a single semiconductor die with a common semiconductor substrate, other arrangements of the illustrated blocks different number of dies, substrates, and/or packages may be arranged to accomplish the same functionality described in this disclosure.

The memory 106 may include a non-transient or non-transitory computer readable medium storing computer-executable instructions as instructions 108 to perform all or a portion of one or more operations described in this disclosure. The instructions 108 may include a multimedia application (or other suitable application such as a messaging application) to be executed by the SoC 100 that records, processes, or outputs audio signals. The instructions 108 may also include other applications or programs executed by the SoC 100, such as an operating system and applications other than for multimedia processing.

In addition to instructions 108, the memory 106 may also store data. The SoC 100 may be coupled to an external memory and configured to access the memory for writing output data files for later use or long-term storage. For example, the SoC 100 may be coupled to a flash storage device comprising NAND memory for storing files Portions of the stored files may be transferred to memory 106 for processing by the SoC 100.

While the SoC 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure. As such, the present disclosure is not limited to a specific device or configuration of components, including the device 100.

Figure 2:
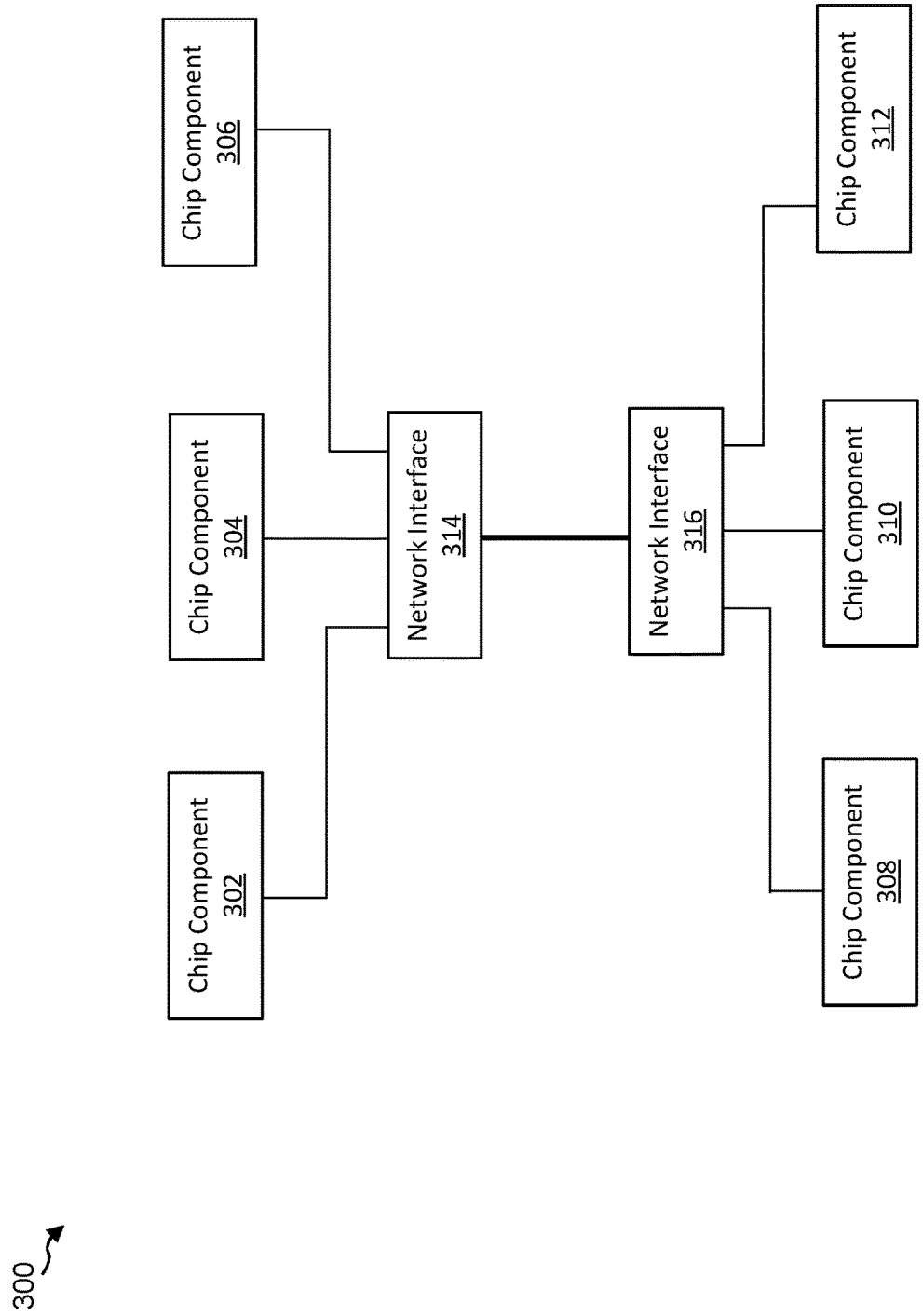
FIGS. 2 and 3 depict systems for routing data in an SoC using virtual channels and credit restrictions according to aspects of the present disclosure.

FIG. 2 depicts a system 300 for networking within an SoC according to one aspect of the present disclosure. The system 300 may be an example of a network on a chip (NOC) implemented on an SoC, such as the SoC 100. The system 300 includes chip components 302, 304, 306, 308, 310, 312, which may be configured to receive data and perform computations. In certain implementations, each of the chip components 302, 304, 306, 308, 310, 312 represents a functional module within a computing device, such as a central processing unit (CPU), a graphics processing unit (GPU), a memory controller unit (MCU), an input/output controller (IOC), a digital signal processor (DSP), a network processing unit (NPU), and the like. The NOC implemented by the system 300 may include one or more network interfaces 314, 316 that are configured to route communications between the chip components 302, 304, 306, 308, 310, 312. To do so, the network interfaces 314, 316 may include one or more receive ports, transmit ports, full ports (capable of both transmit and receive), or combinations thereof. For example, the network interface may include 4 receive ports and 4 transmit ports for communicating with the chip components 302, 304, 306 and the network interface 316. Similarly, the network interface 316 may have 4 receive ports and 4 transmit ports for communicating with the chip components 308, 310, 312 and the network interface 314. To facilitate communications, the network interfaces 314, 316 may include one or more switches, NIUs, CDCs, pipeline connections, die-to-die connections, and the like. The NOC may also include a plurality of shared data connections (represented as lines in FIG. 2) between the network interfaces 314, 316 and the chip components 302, 304, 306, 308, 310, 312. The shared data connections may be connected between ports on the chip components 302, 304, 306, 308, 310, 312 and the network interface 314, 316.

In certain implementations, the chip components 302, 304, 306, 308, 310, 312 may be configured to communicate using virtual channels. In such instances, the network interfaces 314, 316 may be configured to route communications using virtual channels along the shared data connections and to enforce credit restrictions corresponding to each of at least a subset of the virtual channels. Virtual channels may represent conceptual constructs implemented in network-on-chip (NoC) architectures or between chiplets that partition a physical communication channel into multiple independently operated logical channels. In particular, virtual channels may represent a communicative link between two or more chip components 302, 304, 306, 308, 310, 312 that utilize shared physical communicative links, which may be shared with additional chip components. In certain implementations, the virtual channel may correspond to a transmitting chip component, a receiving chip component, particular types of data contents, or a combination thereof. For example, the chip components 302, 310 may be configured to communicate with a first virtual channel and the chip components 302, 304, 306 may be configured to communicate using a second virtual channel. As another example, the chip components 308, 310 may be configured to communicate via a third virtual channel for transmissions with a first type of data and may be configured to communicate via a fourth virtual channel for transmissions with a second type of data. Transmissions along a virtual channel may occur via the physical shared data connections, and may be routed by network interfaces 314, 316 according to the indicated virtual channel. In particular, each virtual channel may be capable of transporting data packets or flits (flow control digits) with distinct routing and priority levels, allowing for simultaneous, differentiated data services over a shared physical medium. This separation into virtual pathways supports more granular control over data traffic along physical resources. For example, by combining virtual channels with corresponding credit restrictions, an NOC may be capable of efficiently controlling, prioritizing, and constraining data communications that use the shared physical data connections.

Figure 3:
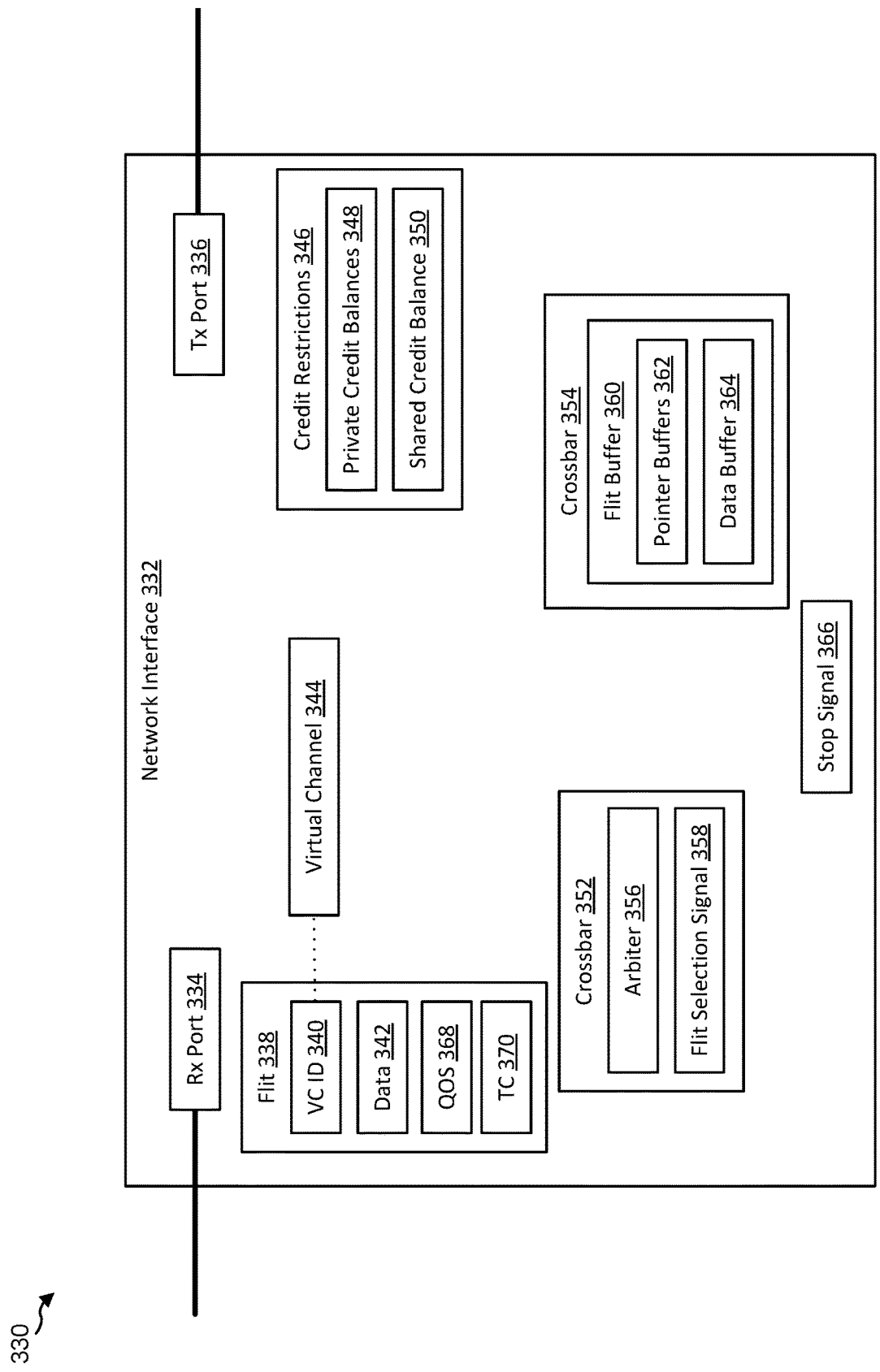

FIG. 3 depicts a system 330 for credit-based data routing along virtual channels according to one aspect of the present disclosure. The system 330 includes a network interface 332, which may be an exemplary implementation of one of the network interfaces 314, 316. In particular, the network interface 332 may be implemented as part of a NOC that enforces credit restrictions for routing data through virtual channels between different chip components. The network interface 332 includes a receive port 334, a transmit port 336, a flit 338, a virtual channel 344, credit restrictions 346, a first crossbar 352, a second crossbar 354, and a stop signal 366. The flit 338 includes a virtual channel identifier 340 and data contents 342. The credit restrictions 346 include private credit balances 348 and a shared credit balance 350. The first crossbar 352 includes an arbiter 356, a flit selection signal 358. The second crossbar 354 includes a flit buffer 360, which includes pointer buffers 362 and a data buffer 364. Although the network interface 332 is depicted as having a single receive port 334 and a single transmit port 336, in various implementations the network interface 332 may have additional or alternative ports. For example, where the network interface 332 is an exemplary implementation of the network interface 316, the network interface 332 may have 4 transmit ports and 4 receive ports. Alternative implementations with more than one receive port and/or transmit port are discussed in greater detail below.

In certain implementations, the chip components 302, 304, 306, 308, 310, 312 communicate via the virtual channels 344 using flits 338 that comprise (i) a virtual channel identifier 340 of a corresponding virtual channel 344 and (ii) data contents 342 for communication. In particular, a transmitting chip component may be configured to create a data flit by combining data contents for transmission to another chip component with a corresponding virtual channel. For example, a network on a chip, or a portion thereof, may be configured to support a particular number of virtual channels. In particular, the network interface 332 may support a certain number of virtual channels, which may each correspond to different chip components, different data types, or a combination thereof. In such instances, each virtual channel 344 supported by the network interface 332 may have a corresponding assigned virtual channel identifier 340. The virtual channel identifiers 340 may be dynamically assigned and signaled to the chip components within the NOC. Additionally or alternatively, the virtual channel identifiers 340 may be statically assigned (such as during manufacture of the SOC that contains the network interface 332). In certain implementations, the chip components may be configured to create flits by adding a virtual channel identifier 340 (such as based on one or more identifiers received from the network interface 332) to the data 342 for transmission. In certain implementations, the chip components may receive and store multiple virtual channel identifiers (such as corresponding to multiple virtual channels that a chip component is permitted to use) and may select the corresponding virtual channel (such as based on a receiving chip component, type of data 342, or combinations thereof). In additional or alternative implementations, the chip components may receive and store a single virtual channel identifier (such as if the chip component is configured to use a single virtual channel) and may include that virtual channel in corresponding transmitted flits.

In certain implementations, a single credit for the credit restrictions 346 entitles a corresponding virtual channel 344 to the transmission of a single flit 338 within the NOC. In additional or alternative implementations, a single credit for the credit restrictions 346 may entitle a corresponding virtual channel 344 to the transmission of more than one flit 338 within the NOC (such as 2 flits, 3 flits, 4 flits, 5 flits, 10 flits, and the like). In certain implementations, credit restrictions 346 may be applied selectively at various credit boundaries within the NOC to control data flow. In certain implementations, a single credit for the credit restriction entitles a corresponding virtual channel 344 to the transmission of a single flit 338 within the NOC. For example, when a single flit 338 arrives at a credit boundary, the presence of a corresponding credit entitles the associated virtual channel 344 to have the flit 338 received and subsequently forwarded by the credit boundary entity, such as a switch or interface. In certain implementations, each of at least the subset of network interfaces are configured to maintain private credit balances 348 corresponding to each of at least the subset of the virtual channels and at least one shared credit balance 350 that may be shared between two or more of the subset of the virtual channels. In certain implementations, an arbiter 356 associated with a network interface 332, may update and monitor these credit balances by dynamically allocating credits between private credit balances 348 and shared credit balance 350 based on current network conditions and data flow requirements.

In certain implementations, at the time of system reset, each network interface 332 may initialize virtual channels with a defined quantity of credits. Subsequently, credits are dynamically released back into the system's credit pool upon the successful transmission and receipt acknowledgment of a flit 338 across a network boundary, replenishing the credits available for future data transfers. To accommodate variations in network load, the NOC may support adaptive credit replenishment rates, which can accelerate the refilling of credits under high-priority data conditions or conserve them during lower network utilization periods. In additional or alternative implementations, the NOC may modulate the credit replenishment rates in response to the behavior of individual chip components, such as so-called flooder components associated with large volumes network traffic in traffic classes of lower priority. The NOC may reduce credit replenishment for virtual channels associated with such flooder components to limit their network usage, which may thereby mitigate any negative impact on the network's performance. In certain implementations, the initial quantity of credits assigned to each of the private credit balances 348 and the shared credit balance 350 may be predetermined (such as when the SOC was manufactured). The quantities assigned to each of the balances 348, 350 may be determined based on an expected amount of communication for chip components and/or data types for corresponding virtual channels. In certain examples, one or more simulations may be performed to simulate expected operation of the SOC and expected transmissions within the NOC. In such instances, the simulations may be used to determine and test the defined quantities of credits used for the balances 348, 350.

In certain implementations, some virtual channels may be universally supported across all network interfaces 332 within the system 300, facilitating broad communication coverage. Conversely, there may be virtual channels that are only supported by a select subset of network interfaces, allowing for specialized data routing within the network. For example, an SoC may have a plurality of virtual channels that are used by different combinations of a plurality of chip components and may have a plurality of network interfaces that enforce credit boundaries within an NOC. In such instances, a first subset of the virtual channels may only be used by a portion of the chip components. Accordingly, the first subset of the virtual channels may only be supported by a first subset of the network interfaces that support those chip components.

Each network interface 332 of at least the subset of the plurality of network interfaces may include a first crossbar 352 and a second crossbar 354. Crossbars may be components or circuitry within a network interface (such as a switch) that are configured to manage and direct the flow of data and signals within the network interface. Crossbars may be configured to dynamically route associated data from multiple input sources to the correct output destinations, ensuring efficient data transmission within the computing system. Crossbars may utilize a matrix-like structure or wires to simultaneously handle numerous data paths. The first crossbar 352 may be configured to determine and route virtual channel 344 identifiers for received flits 338. The second crossbar 354 may be configured to receive, store, and route data contents 342 for received flits 338. The network interface 332 is depicted for simplicity as having a single receive port 334 and a single transmit port 336. In various implementations, network interfaces may differ in their configurations, such as by having a different number of ports, a different number of receive ports, a different number of transmit ports, a different number of full ports, or a combination thereof.

In certain implementations, the second crossbar 354 may include a flit buffer 360. The flit buffer 360 may be store the data contents 342 of received flits 338 within a data buffer 364, which may be shared between two or more of the subset of the plurality of virtual channels. In certain implementations, the data buffer 364 may be implemented as a register file. In certain implementations, the flit buffer 360 may be further configured to store a pointer to the stored data contents 342 in association with the corresponding virtual channel 144 for the flit 338. In certain implementations, the flit buffer 360 may include separate pointer buffers 362 for each of the subset of the plurality of virtual channels. In such instances, the flit buffer 360 may be configured to store pointers to stored data contents 342 within corresponding pointer buffers 362 for virtual channels in which the flits 338 are received. In certain implementations, a pointer buffer 362 may maintain a list of pointers for corresponding data contents stored within the data buffer. Pointer buffers 362 may utilize various organizational structures such as FIFO (First-In, First-Out), LIFO (Last-In, First-Out), or other suitable methodologies based on specific network requirements. Preferred implementations may utilize FIFO structures. Pointers stored within the pointer buffers 362 may correspond to specific locations within the flit buffer 360 (e.g., within the data buffer 364). In certain implementations, stored pointers may include physical memory addresses, unique identifiers (such as ID-based locations), other addressing mechanisms, or combinations thereof.

In certain implementations, corresponding sizes of the pointer buffers 362 are determined and/or preconfigured based on the allocation of credits between the subset of the plurality of virtual channels. In certain implementations, sizes of the pointer buffers 362 may be determined based on private credit balances 348, shared credit balances 350, or a combination thereof. For example, the size of a first pointer buffer associated with a first virtual channel may be determined by the sum of the number of private credits directly associated the first channel and the total number of shared credits that the first channel is permitted to use. Such implementations may ensure ample buffer capacity to match the potential incoming data volume. As another example, one or more simulations may be employed to apportion shared credits among multiple virtual channels (such as based on traffic analysis, projected data patterns, or statistical models considering various operational scenarios of the NOC). Such implementations may reduce computing resource utilization (such as by reducing buffer size and associated power usage), but may require more complicated chip design processes to account for the simulations and may result in less flexible chip designs. In certain implementations, the network interface 332 may include separate flit buffers 360 for each port (such as each receive port) within the network interface 332.

In certain implementations, the first crossbar 352 may be further configured to select flits 338 for transmission such that transmitted flits 338 comply with credit restrictions 346 for corresponding virtual channels. In certain implementations, the first crossbar 352 further includes an arbiter 356 configured to determine a flit selection signal 358 that identifies flits 338 for transmission such that transmitted flits 338 comply with credit restrictions 346 for corresponding virtual channels. In certain implementations, the second crossbar 354 may be further configured to receive the flit selection signal 358 from the first crossbar 352 and to retrieve corresponding data contents 342 for transmission by the network interface 332. In certain implementations, the flit buffer 360 may be configured to receive the flit selection signal 358 from the arbiter 356 and retrieve a pointer from a corresponding pointer buffer based on the flit selection signal 358. In certain implementations, the flit buffer 360 may be further configured to retrieve the data contents 342 for transmission from the register file based on the pointer.

Figure 4A:
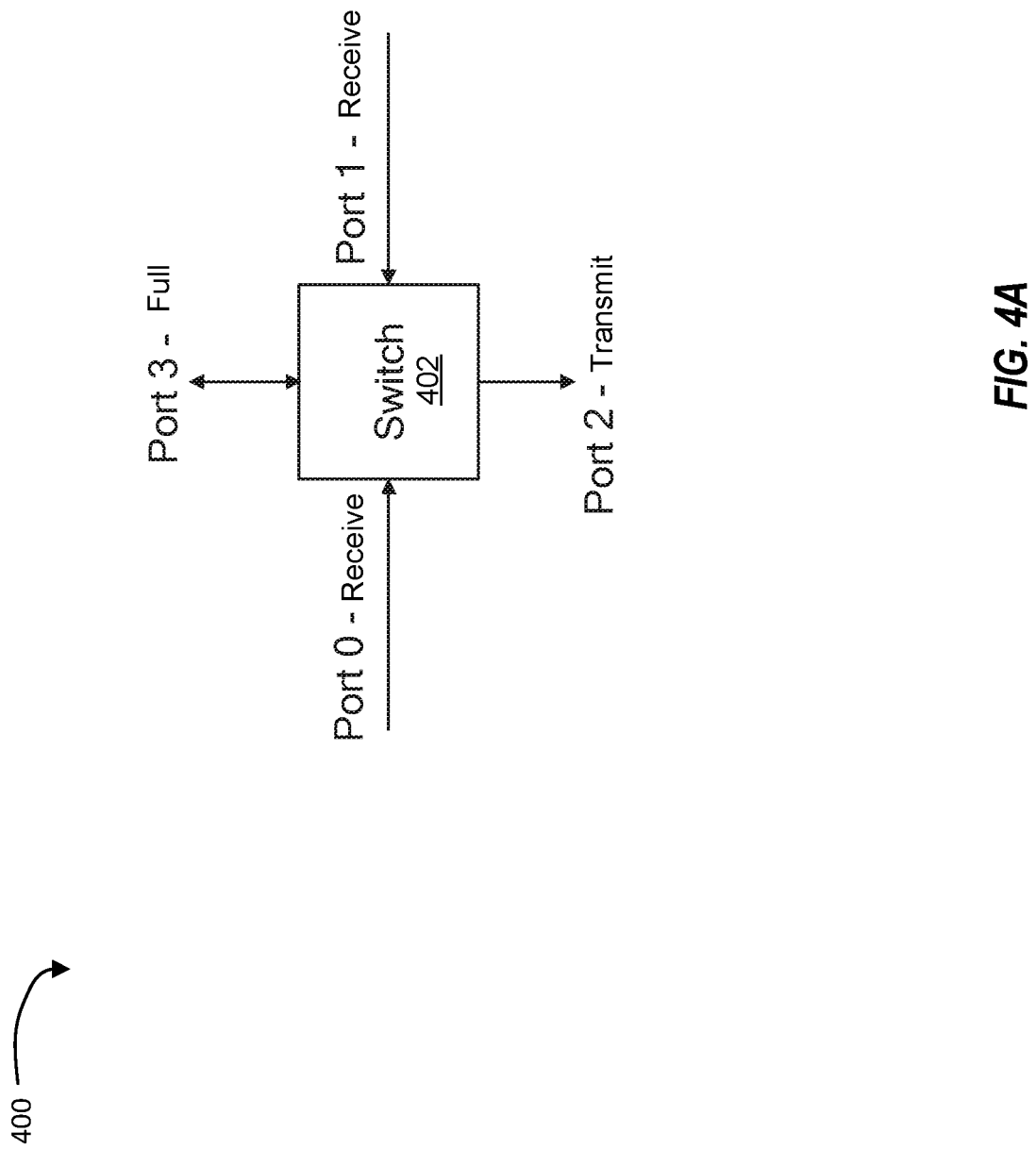
FIG. 4A depicts a port configuration according to one aspect of the present disclosure.
Figure 4B:
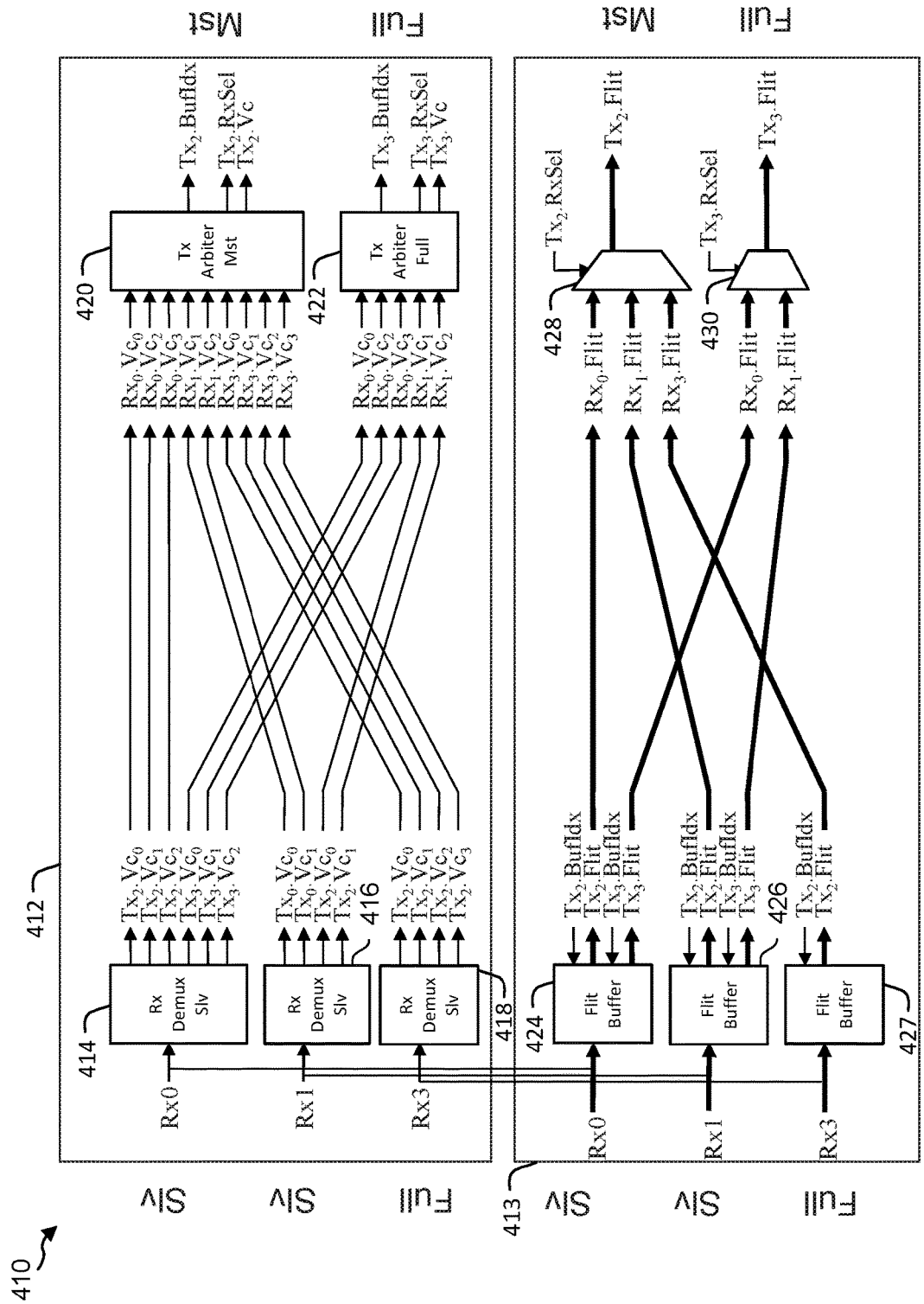
FIG. 4B depicts a crossbar configuration according to one aspect of the present disclosure.

As one example, FIG. 4A depicts a port configuration 400 for a network interface according to one aspect of the present disclosure. In particular, the port configuration 400 includes a switch 402 with four ports (labeled ports 0-3). Ports 0 and 1 are slave ports that are only capable of receiving data. Port 2 is a master port that is only capable of transmitting data. Port 3 is a full port that is capable of transmitting and/or receiving data. FIG. 4B depicts a crossbar configuration 410 of the switch 402 according to one aspect of the present disclosure. The crossbar configuration 410 includes a first crossbar 412, which may correspond to the first crossbar 352, and a second crossbar 413, which may correspond to the second crossbar 354. The first crossbar 352 includes input demultiplexers 414, 416, 418 that respectively correspond to the ports 0, 1, and 3 that are capable of receiving data. The first crossbar 352 also includes output arbiters 420, 422, which may be exemplary implementations of the arbiter 356. The output arbiters 420, 422 may respectively corresponding to the ports 2 and 3 that are capable of transmitting data. The arbiters 420, 422 may be configured to select flits for transmission via the corresponding ports 2 and 3. For example, a flit from a first virtual channel may be selected for transmission using port 2 and a flit from a second virtual channel may be selected for transmission using port 3. In particular, the input demultiplexers 414, 416, 418 may be configured to determine signals denoted $Tx_i$, $Vc_j$, where i indicates a port by which data in virtual channel j may be transmitted. The arbiters 420, 422 may receive these signals and select between them to determine one or more control signal, including (1) $Tx_i$,BufIdx, which indicates a buffer index in a pointer buffer for data to be transmitted using port i, (2) $Tx_i$,RxSel, which indicates a receive port by which data to be transmitted using port i was received, and (3) $Tx_i$, Vc, which indicates a virtual channel for data to be transmitted using port i. The multiplexers then receive control signals from the flit buffers 424, 426, 427 and the arbiters 420, 422 and select output flits for each of the ports. In FIG. 4B, certain indexes are remapped. For example, in the first crossbar, indexes $Tx_i$, $Vc_j$ are remapped when provided to the arbiters 420, 422 as $Rx_iVc_j$ signals. As another example, $Tx_i$Flit signals are remapped as $Rx_i$Flit when provided to the output selectors 428, 430. In practice, such remapping may provide unique values or indexes for each link within the crossbars 412, 413, and may reduce the total number of virtual channel identifiers required in parts of an NOC that do not support all virtual channels. However, such remapping may not be used in all implementations, and may not change the values of the signals themselves.

Figure 4C:
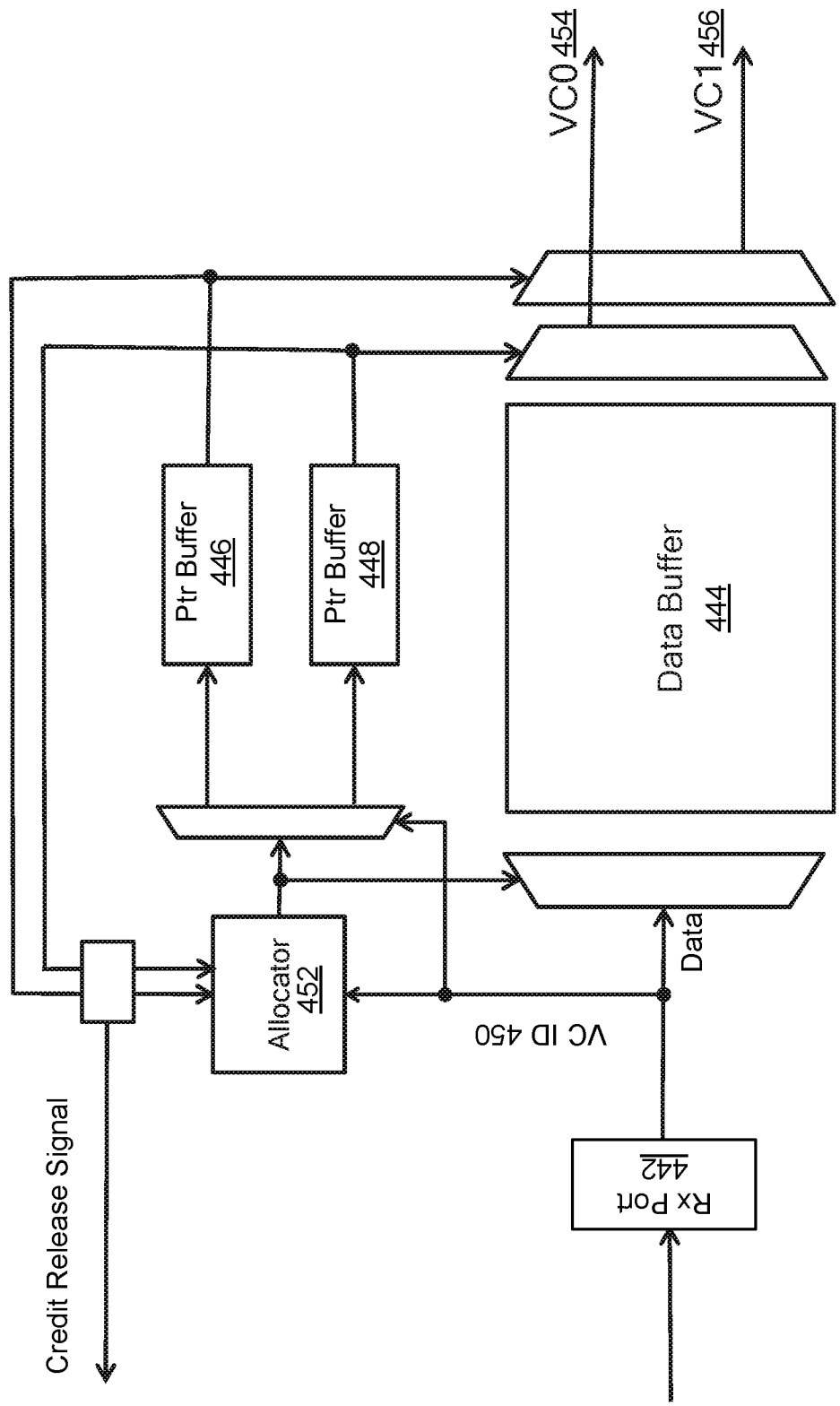
FIG. 4C depicts a flit buffer according to one aspect of the present disclosure.

The second crossbar 413 includes flit buffers 424, 426, 427 that respectively correspond to the ports 0, 1, and 3 that are capable of receiving data. The flit buffers 424, 426, 427 may function similarly to the flit buffer 360. For example, FIG. 4C depicts a flit buffer 440 according to one aspect of the present disclosure. The flit buffer 440 includes a receive port 442 by which data flits may be received, which may be an exemplary implementation of the receive port 334. For a received flit, the flit buffer 440 extracts a virtual channel ID 450 to an allocator 452. The allocator 452 may be configured to receive a virtual channel ID and determine an address to store received data for the associated virtual channel within the data buffer 444. The address may then be provided (such as via a multiplexer) to the data buffer 444, which may store the data contents of the flit at the identified address. A selection multiplexer also receives the address, along with the virtual channel identifier, and provides the address to a pointer buffer 446, 448 associated with the specified virtual channel for the virtual channel identifier 450, which may then store the address for future use in retrieving and transmitting the data. When data is selected for transmission, the corresponding data may be retrieved from the data buffer 444 and output as a signal for the corresponding virtual channel via the output ports 454, 456. Once output, a credit release signal may be transmitted by the flit buffer (such as to an arbiter 420, 422) to release credits for the associated virtual channel. Similarly, a signal identifying the address for the transmitted data may be provided to the allocator 452, which may mark the address as available for storage of future data flits.

Returning to FIG. 4B, the second crossbar 413 also includes output selectors 428, 430, which may be configured to select flits for transmission based on flit selection signals received from the first crossbar (such as the arbiters 420, 422). In particular, the flit buffers 424, 426, 427 may receive $Tx_i$,BufIdx signals from the arbiters and may determine corresponding $Tx_i$,Flit signals that contain the data flit at the indicated index. These signals may be provided to the corresponding output selectors 428, 430, which may receive the $Tx_i$,RxSel signals and may determine an output signal $Tx_i$,Flit for each of the i ports for the indicated RxSel signal.

Returning to FIG. 3B, the network interface 332 may be configured to incorporate additional or alternative selection strategies beyond credit restrictions in addition or alternative to credit restrictions 346 when identifying flits 338 for transmission. In certain implementations, the arbiter 356 is capable of analyzing traffic class information associated with each stored flit 338. For example, the flit 338 may, in certain implementations, include a traffic class 370 that identifies a particular traffic class for the flit 338. Traffic classes 370 may be categories that define the nature and priority of data packets, distinguishing between various levels of service requirements. High-priority traffic classes often represent time-sensitive or critical system operations, while lower-priority traffic classes might encompass less urgent data transmissions. In instances where the traffic class takes precedence, the arbiter 356 may opt to select the flit 338 with the highest traffic class for transmission, provided that this selection adheres to the prevailing credit restrictions. In certain implementations, in addition to credit restrictions balances 348 associated with particular virtual channels, different traffic classes may also have private credit balances 348 allocated that can be used to support prioritized transmission of associated flits.

In additional or alternative implementations, the arbiter 356 may be configured to assess Quality of Service (QOS) data associated with stored flits 338. For example, the flit 338 may, in certain implementations, include a QOS 368 that identifies a particular QOS for the flit 338. The QOS 368 may indicate an overall level of service or performance for an associated data transmission. The QOS policies can prioritize flits based on a range of criteria, including latency sensitivity, bandwidth requirements, and error resilience. When QOS considerations influence the selection process, the arbiter 356 may prioritize flits 338 that have superior QOS metrics and are in compliance with existing credit restrictions. In certain implementations, in addition to credit restrictions balances 348 associated with particular virtual channels, different QOSs may also have private credit balances 348 allocated that can be used to support prioritized transmission of associated flits.

In additional or alternative implementations, the arbiter 356 may be configured to consider transmission delay conditions as part of its flit selection process for routing. A transmission delay may include latency encountered in the data delivery process within the NOC, which can affect the performance of time-dependent operations and responsiveness. The arbiter 356, upon recognizing such delay-sensitive flits 338 (such as based on one or more associated timing parameters), may prioritize selection and transmission to flits that are subject to transmission constraints and/or are likely to violate one or more associated transmission constraints that also comply with the credit restrictions 346 in place.

In certain implementations, the network interface 332 may be configured to selectively utilize private credits for virtual channels that have a positive private credit balance, thereby ensuring dedicated resources are applied to channels actively transmitting data. Conversely, shared credits may be employed when a virtual channel 344, which would normally be selected based on specific criteria such as traffic urgency or QOS requirements, finds its private credit balance depleted to zero. For example, if a particular virtual channel 344 has a flit that would be selected for transmission by the arbiter 356 has an exhausted private credit balance 348, the flit may be selected for transmission using shared credits from the shared credit balance 350.

The network interface 332 may be further configured to determine a stop signal 366 that stops the reception of data for a predetermined period of time. The predetermined period of time may be static (such as may be the same for each application of the stop signal 366). Additionally or alternatively, the predetermined period of time may be determined when the stop signal 366 is applied (such as shortly before or after determining the stop signal 366). In certain implementations, the stop signal 366 may be applied across multiple network interfaces. For example, the stop signal 366 may be transmitted in the opposite direction of data flows. In particular, a network interface (such as the network interface 332) may determine the stop signal 366 and may transmit the stop signal 366 to another network interface (such as an upstream network interface). Additionally, a network interface 332 that receives a stop signal 366 may re-transmit the stop signal 366 to further upstream network interfaces. Network interfaces 332 that receive or determine a stop signal 366 may stop the receipt of new data flits for a predetermined period of time. The coordinated pause enabled by the stop signal 366 may allow the NOC to manage data traffic proactively, preventing congestion and ensuring orderly processing within the NOC's architecture. Additionally, the stop signal 366 may help ensure synchronization between different clock signals by exerting the stop signal 366 at a clock signal boundary (such as between two or more differently-clocked components) at regular intervals to synchronize the differing clock signals. In certain implementations, the stop signal 366 may be used to adapting serialization to optimize data transmission. In still further implementations, the stop signal 366 may be used to control power consumption by stopping data transmission at regular intervals. Furthermore, the stop signal 366 may be determined independently of current traffic conditions (such as at regular intervals, based on current power consumption levels), which may prevent the stop signal 366 from creating deadlocks. Furthermore, the stop signal 366 may enable or otherwise reset credit allocations, which may reduce the need for additional credit boundaries. In particular, the combination of resetting credit allocations at reset (such as instead of using an error-prone finite state machine) and using the stop signal as described above may enable simplified power disconnect for chip components. Additionally, the stop signal 366 may be used for adaptation between different clock domains (such as portions of an SoC that operate using different clock signals). For example, a stop signal 366 may be activated at regular intervals for adaptation between two different clock domains. Such configurations may reduce the need for additional credit boundaries at the clock boundaries.

In certain implementations, the NOC may include one or more pipeline or die-to-die connections. In such implementations, the network interfaces 322 for a NOC may be located external to these connections. In certain implementations, at least a subset of the plurality of switches may be located at a boundary of a pipe connection within the NOC. In certain implementations, a pipe connection may include a dedicated pathway or channel within the NOC that connects specific components or modules. Such pipelines may allow for efficient data transfer between these components within the NOC. The boundaries of the pipe connection may include interfaces that connect the physical pipeline to the serviced components (such as network interfaces located between a pipeline and one or more connected components). For example, the network interface 332 may be located at the boundary. Additionally, at least a subset of the plurality of network interfaces in a NOC may be located at a boundary of a die-to-die connection within the NOC. Die-to-die connections for chips may include connections between different physical dies that form a system. The boundaries of the die-to-die connection may include interfaces that connect the physical die-to-die connection to other components of the chip and/or other components of the NOC. For example, the network interface 332 may be located at the boundary of the die-to-die connection.

The described techniques may be used for different types of chip implementations. In certain implementations, these techniques can be applied to various chip implementations, including on-chip implementations, chiplet-to-chiplet implementations, and implementations involving bidirectional or unidirectional links. For example, in an on-chip implementation, the described techniques may be primarily focused on NOCs on a single chip or die (such as without die-to-die connections). In another example, chiplet-to-chiplet implementations may involve interconnecting multiple chiplets to create a larger chip. Here, the described techniques may be used to facilitate smooth communication and data exchange between these chiplets (such as via a die-to-die connection).

Figure 5:
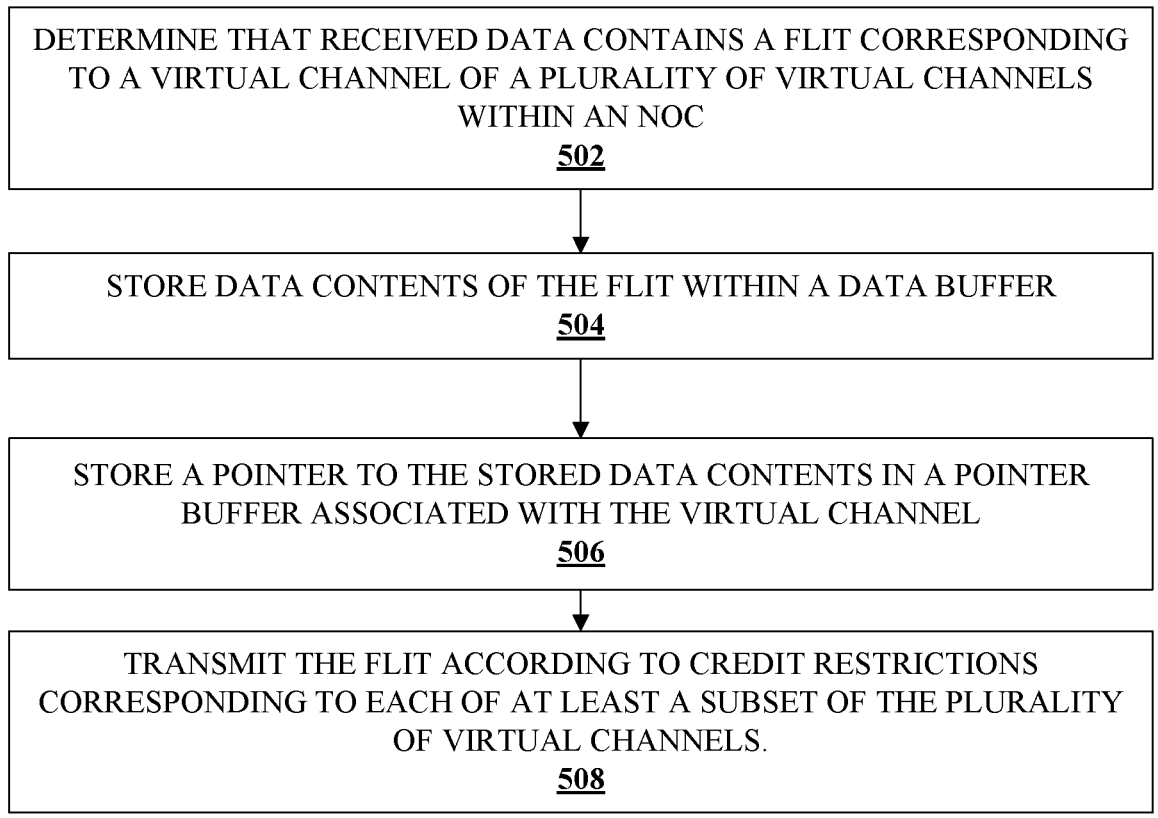
FIG. 5 depicts for routing data in an SoC using virtual channels and credit restrictions according to one aspect of the present disclosure.

The systems 300, 330 may be configured to perform the operations described with reference to FIG. 5 to route data within an SoC. FIG. 5 shows a flow chart of an example method 500 for routing data within an NOC using virtual channels and credit restrictions. Each of the operations described with reference to FIG. 3 may be performed by one or a combination of the processors of the SoC 100.

The method 500 includes determining that received data contains a flit corresponding to a virtual channel of a plurality of virtual channels within the NOC (block 502). For example, the network interface 332 may determine that received data contains a flit 338 corresponding to a virtual channel 344 of a plurality of virtual channels within the NOC. In certain implementations, the flit 338 comprises (i) a virtual channel 344 identifier of the virtual channel 344 and (ii) the data contents 342 for transmission. The method 500 includes storing data contents of the flit within a data buffer (block 504). For example, the network interface 332 may store data contents 342 of the flit 338 within a data buffer 364, which may be shared between two or more of the plurality of virtual channels. In certain implementations, the data buffer 364 may be implemented as a register file.

The method 500 includes storing a pointer to the stored data contents in a pointer buffer associated with the virtual channel (block 506). For example, the network interface 332 may store a pointer to the stored data contents 342 in a pointer buffer 362 associated with the virtual channel 344.

The method 500 includes transmitting the flit according to credit restrictions corresponding to each of at least a subset of the plurality of virtual channels (block 508). For example, the network interface 332 may transmit the flit 338 according to credit restrictions 346 corresponding to each of at least a subset of the plurality of virtual channels. In certain implementations, a single credit for the credit restriction entitles a corresponding virtual channel 344 to the transmission of a single flit 338 within the NOC. In certain implementations, the credit restrictions 346 comprise private credit balances 348 corresponding to each of at least the subset of the virtual channels and at least one shared credit balance 350 that may be shared between two or more of the subset of the virtual channels.

In certain implementations, transmitting the flit 338 according to the credit restrictions 346 includes determining a flit selection signal 358 to select a flit 338 for transmission that complies with the credit restrictions 346. In certain implementations, the flit selection signal 358 may be further determined to comply with one or more of a traffic class restriction, a quality of service restriction, and a transmission delay restriction. In certain implementations, transmitting the flit 338 according to the credit restrictions 346 may further include retrieving a pointer from the pointer buffer based on the flit selection signal 358, retrieving the data contents 342 for transmission from the register file based on the pointer, and transmitting the data contents 342. In certain implementations, storing the data pointer may be performed by a first crossbar 352 of the network interface 332 and storing the data contents 342 may be performed by a second crossbar 354 of the network interface 332.

The method 500 may further include determining a stop signal 366, transmitting the stop signal 366 to at least one preceding network interface 332 within the NOC, and stopping reception of data for a predetermined period of time.

The method 500 may be implemented on a computer system, such as one or more of the systems 100, 300, 330. The method 500 may also be implemented by a set of instructions stored on a computer readable medium that, when executed by a processor, cause the computing device to perform the method 500. Although the examples below are described with reference to the flowchart illustrated in FIG. 5, many other methods of performing the acts associated with FIG. 5 may be used. For example, the order of some of the blocks may be changed, certain blocks may be combined with other blocks, one or more of the blocks may be repeated, and some of the blocks may be optional.

In one or more aspects, techniques for supporting signal processing may include additional aspects, such as any single aspect or any combination of aspects described below or in connection with one or more other processes or devices described elsewhere herein.

A first aspect provides a system on a chip (SoC) comprising chip components for receiving data and performing computations and a network on a chip (NOC) configured to route communications between the chip components. The NOC includes a plurality of network interfaces and a plurality of shared data connections between the network interfaces, wherein each of at least a subset of the plurality of network interfaces are configured to route communications using a plurality of virtual channels along the shared data connections and to enforce credit restrictions corresponding to each of at least a subset of the virtual channels.

In a second aspect, in combination with the first aspect, the chip components communicate using flits that comprise (i) a virtual channel identifier of a corresponding virtual channel and (ii) data contents for communication.

In a third aspect, in combination with the second aspect, a single credit for the credit restriction entitles a corresponding virtual channel to transmission of a single flit within the NOC.

In a fourth aspect, in combination with the third aspect, each of at least the subset of network interfaces are configured to maintain private credit balances corresponding to each of at least the subset of the virtual channels.

In a fifth aspect, in combination with the fourth aspect, each of at least the subset of network interfaces are further configured to maintain at least one shared credit balance that is shared between two or more of the subset of the virtual channels.

In a sixth aspect, in combination with one or more of the first aspect through the fifth aspect, each network interface of at least the subset of the plurality of network interfaces comprises a first crossbar configured to determine and route virtual channel identifiers for received flits and a second crossbar configured to receive, store, and route data contents for received flits.

In a seventh aspect, in combination with the sixth aspect, the first crossbar further comprises an arbiter configured to determine a flit selection signal that identifies flits for transmission such that transmitted flits comply with credit restrictions for corresponding virtual channels.

In an eighth aspect, in combination with the seventh aspect, the second crossbar is further configured to receive the flit selection signal and to retrieve corresponding data contents for transmission by the network interface.

In a ninth aspect, in combination with the eighth aspect, the second crossbar includes a flit buffer that is configured to store the data contents of received flits within a register file, wherein the register file is shared between two or more of the subset of the plurality of virtual channels; and store a pointer to the stored data contents in association with corresponding virtual channels.

In a tenth aspect, in combination with the ninth aspect, the flit buffer is configured to receive the flit selection signal from the arbiter, retrieve a pointer from a corresponding pointer buffer based on the flit selection signal, and retrieve the data contents for transmission from the register file based on the pointer.

In an eleventh aspect, in combination with the tenth aspect, the flit buffer comprises separate pointer buffers for each of the subset of the plurality of virtual channels, and the flit buffer is configured to store pointers to stored data contents within corresponding pointer buffers for virtual channels in which the flits are received.

In a twelfth aspect, in combination with the eleventh aspect, corresponding sizes of the pointer buffers are determined based on an allocation of credits between the subset of the plurality of virtual channels.

In a thirteenth aspect, in combination with one or more of the first aspect through the twelfth aspect, the arbiter is further configured to determine the flit selection signal such that transmitted flits further comply with traffic class restrictions, quality of service restrictions, or a combination thereof.

In a fourteenth aspect, in combination with one or more of the first aspect through the thirteenth aspect, the subset of the plurality of network interfaces are further configured to determine a stop signal that stops reception of data for a predetermined period of time.

In a fifteenth aspect, in combination with one or more of the first aspect through the fourteenth aspect, at least a subset of the plurality of switches are located at a boundary of a pipe connection within the NOC, a boundary of a die-to-die connection within the NOC, or a combination thereof.

A sixteenth aspect provides a method of a network interface in a network on a chip (NOC). The method comprises determining that received data contains a flit corresponding to a virtual channel of a plurality of virtual channels within the NOC; storing data contents of the flit within a register file, wherein the register file is shared between two or more of the plurality of virtual channels; storing a pointer to the stored data contents in a pointer buffer associated with the virtual channel; and transmitting the flit according to credit restrictions corresponding to each of at least a subset of the plurality of virtual channels.

In a seventeenth aspect, in combination with the sixteenth aspect, transmitting the flit according to the credit restrictions comprises determining a flit selection signal to select a flit for transmission that complies with the credit restrictions.

In an eighteenth aspect, in combination with the seventeenth aspect, transmitting the flit according to the credit restrictions comprises retrieving a pointer from the pointer buffer based on the flit selection signal, retrieving the data contents for transmission from the register file based on the pointer, and transmitting the data contents.

In a nineteenth aspect, in combination with the sixteenth aspect, the method further comprises determining a stop signal, transmitting the stop signal to at least one preceding network interface within the NOC, and stopping reception of data for a predetermined period of time.

A twentieth aspect provides a system comprising chip components for receiving data and performing computations and a network on a chip (NOC) configured to route communications between the chip components. The NOC includes a plurality of network interfaces and a plurality of shared data connections between the network interfaces. Each of at least a subset of the plurality of network interfaces are configured to route communications using virtual channels along the shared data connections and to enforce credit restrictions corresponding to each of at least a subset of the virtual channels.

Additionally, the system may perform or operate according to one or more aspects as described below. In some implementations, the system includes a wireless device, such as a UE. In some implementations, the system includes a remote server, such as a cloud-based computing solution, which receives image data for processing to determine output image frames. In some implementations, the system may include at least one processor, and a memory coupled to the processor. The processor may be configured to perform operations described herein with respect to the apparatus. In some other implementations, the system may include a non-transitory computer-readable medium having program code recorded thereon and the program code may be executable by a computer for causing the computer to perform operations described herein with reference to the apparatus. In some implementations, the system may include one or more means configured to perform operations described herein. In some implementations, a method of wireless communication may include one or more operations described herein with reference to the apparatus.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Unless specifically stated otherwise as apparent from the following discussions, it is appreciated that throughout the present application, discussions using terms such as "accessing," "receiving," "sending," "using," "selecting," "determining," "normalizing," "multiplying," "averaging," "monitoring," "comparing," "applying," "updating," "measuring," "deriving," "settling," "generating," or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices. The use of different terms referring to actions or processes of a computer system does not necessarily indicate different operations. For example, "determining" data may refer to "generating" data. As another example, "determining" data may refer to "retrieving" data.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the description and examples herein use the term "device" to describe various aspects of the disclosure, the term "device" is not limited to a specific configuration, type, or number of objects. As used herein, an apparatus may include a device or a portion of the device for performing the described operations.

Certain components in a device or apparatus described as "means for accessing," "means for receiving," "means for sending," "means for using," "means for selecting," "means for determining," "means for normalizing," "means for multiplying," or other similarly-named terms referring to one or more operations on data, such as image data, may refer to processing circuitry (e.g., application specific integrated circuits (ASICs), digital signal processors (DSP), graphics processing unit (GPU), central processing unit (CPU), computer vision processor (CVP), or neural signal processor (NSP)) configured to perform the recited function through hardware, software, or a combination of hardware configured by software.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to the Figures referenced above include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill in the art that one or more blocks (or operations) described with reference to FIG. 5 may be combined with one or more blocks (or operations) described with reference to another of the figures. For example, one or more blocks (or operations) of FIG. 5 may be combined with one or more blocks (or operations) of FIG. 1, 2A-2C, 3A-3B, or 4A-4C.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and processes described above. Whether such functionality is implemented in hardware or software depends upon the particular application and design constraints imposed on the overall system.

In one or more aspects, the operations described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

The operations of a method or algorithm disclosed herein may be implemented in a processor-executable software module which may reside on a computer-readable medium and commercially made available as a computer program product as software. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc wherein disks usually reproduce data magnetically and discs reproduce data optically with lasers. Combinations of the above should also be included within the scope of computer-readable media.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, opposing terms such as "upper" and "lower," or "front" and back," or "top" and "bottom," or "forward" and "backward," or "left" and "right" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown, or in sequential order, or that all illustrated operations be performed to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

The term "substantially" is defined as largely, but not necessarily wholly, what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A system on a chip (SoC) comprising:
   chip components for receiving data and performing computations; and
   a network on a chip (NOC) configured to route communications between the chip components, comprising:
      a plurality of network interfaces; and
      a plurality of shared data connections between the network interfaces,
      wherein each of at least a subset of the plurality of network interfaces are configured to route communications using a plurality of virtual channels along the shared data connections and to enforce credit restrictions corresponding to each of at least a subset of the virtual channels,
      wherein each network interface of at least the subset of the plurality of network interfaces comprises a flit buffer, wherein the flit buffer comprises separate pointer buffers for each of the subset of the plurality of virtual channels, and wherein the flit buffer is configured to store pointers to stored data contents within corresponding pointer buffers for virtual channels of received flits.

2. The SoC of claim 1, wherein the chip components communicate using flits that comprise (i) a virtual channel identifier of a corresponding virtual channel and (ii) data contents for communication.

3. The SoC of claim 2, wherein a single credit for the credit restrictions enables a corresponding virtual channel to transmit of a single flit within the NOC.

4. The SoC of claim 3, wherein each of at least the subset of network interfaces are configured to maintain private credit balances corresponding to each of at least the subset of the virtual channels.

5. The SoC of claim 4, wherein each of at least the subset of network interfaces are further configured to maintain at least one shared credit balance that is shared between two or more of the subset of the virtual channels.

6. The SoC of claim 1, wherein each network interface of at least the subset of the plurality of network interfaces comprises:
- a first crossbar configured to determine and route virtual channel identifiers for received flits; and
- a second crossbar configured to receive, store, and route data contents for received flits.

7. The SoC of claim 6, wherein the first crossbar further comprises an arbiter configured to determine a flit selection signal that identifies flits for transmission such that transmitted flits comply with credit restrictions for corresponding virtual channels.

8. The SoC of claim 7, wherein the second crossbar is further configured to receive the flit selection signal and to retrieve data contents for transmission by the network interface.

9. The SoC of claim 8, wherein the second crossbar includes the flit buffer, and wherein the flit buffer is further configured to:
- store the data contents of received flits within a register file, wherein the register file is shared between two or more of the subset of the plurality of virtual channels; and
- store a pointer to the data contents in association with corresponding virtual channels.

10. The SoC of claim 9, wherein the flit buffer is configured to:
- receive the flit selection signal from the arbiter;
- retrieve a pointer from a corresponding pointer buffer based on the flit selection signal; and
- retrieve the data contents for transmission from the register file based on the pointer.

11. The SoC of claim 1, wherein corresponding sizes of the separate pointer buffers are determined based on an allocation of credits between the subset of the plurality of virtual channels.

12. The SoC of claim 7, wherein the arbiter is further configured to determine the flit selection signal such that transmitted flits further comply with traffic class restrictions, quality of service restrictions, or a combination thereof.

13. The SoC of claim 1, wherein the subset of the plurality of network interfaces are further configured to determine a stop signal that stops reception of data for a predetermined period of time.

14. The SoC of claim 1, wherein at least a subset of the plurality of network interfaces are located at a boundary of a pipe connection within the NOC, a boundary of a die-to-die connection within the NOC, or a combination thereof.

15. A method of a network interface in a network on a chip (NOC) comprising:
- determining that received data contains a flit corresponding to a virtual channel of a plurality of virtual channels within the NOC;
- storing data contents of the flit within a register file, wherein the register file is shared between two or more of the plurality of virtual channels;
- storing a pointer to the data contents in a pointer buffer associated with the virtual channel; and
- transmitting the flit according to credit restrictions corresponding to each of at least a subset of the plurality of virtual channels by:
    - retrieving a pointer from the pointer buffer based on a flit selection signal;
    - retrieving the data contents for transmission from the register file based on the pointer; and
    - transmitting the data contents.

16. The method of claim 15, wherein transmitting the flit according to the credit restrictions comprises determining the flit selection signal to select a flit for transmission that complies with the credit restrictions.

17. The method of claim 15, further comprising:
- determining a stop signal;
- transmitting the stop signal to at least one preceding network interface within the NOC; and
- stopping reception of data for a predetermined period of time.

18. A system comprising:
- chip components for receiving data and performing computations; and
- a network on a chip (NOC) configured to route communications between the chip components, comprising:
    - a plurality of network interfaces; and
    - a plurality of shared data connections between the network interfaces,
    - wherein each of at least a subset of the plurality of network interfaces are configured to route communications using a plurality of virtual channels along the shared data connections and to enforce credit restrictions corresponding to each of at least a subset of the plurality of virtual channels,
    - wherein each network interface of at least the subset of the plurality of network interfaces comprises a flit buffer, wherein the flit buffer comprises separate pointer buffers for each of the subset of the plurality of virtual channels, and wherein the flit buffer is configured to store pointers to stored data contents within corresponding pointer buffers for virtual channels of received flits.

* * * * *